United States Patent [19]

Arcella

[11] 4,067,237
[45] Jan. 10, 1978

[54] NOVEL HEAT PIPE COMBINATION
[75] Inventor: Frank G. Arcella, Bethel Park, Pa.
[73] Assignee: Westinghouse Electric Corporation, Pittsburgh, Pa.
[21] Appl. No.: 713,175
[22] Filed: Aug. 10, 1976
[51] Int. Cl.[2] .................... G01F 1/68; G01K 11/02; F28D 15/00
[52] U.S. Cl. ........................ 73/204; 73/349; 73/362.8; 165/105
[58] Field of Search ............... 73/190 H, 204, 349, 73/362.8; 165/105

[56] References Cited
U.S. PATENT DOCUMENTS

| | | | |
|---|---|---|---|
| 2,504,588 | 4/1950 | Rinia | 73/349 |
| 3,433,929 | 3/1969 | Snelling | 165/105 |
| 3,451,266 | 6/1969 | Grover et al. | 73/190 |
| 3,525,386 | 8/1970 | Grover | 165/105 |
| 3,564,727 | 2/1971 | Fraser | 165/105 |
| 3,566,676 | 3/1971 | Hays | 165/105 |

Primary Examiner—Herbert Goldstein
Attorney, Agent, or Firm—M. P. Lynch

[57] ABSTRACT

The basic heat pipe principle is employed in a heat pipe combination wherein two heat pipes are combined in opposing relationship to form an integral unit; such that the temperature, heat flow, thermal characteristics, and temperature-related parameters of a monitored environment or object exposed to one end of the heat pipe combination can be measured and controlled by controlling the heat flow of the opposite end of the heat pipe combination.

19 Claims, 7 Drawing Figures

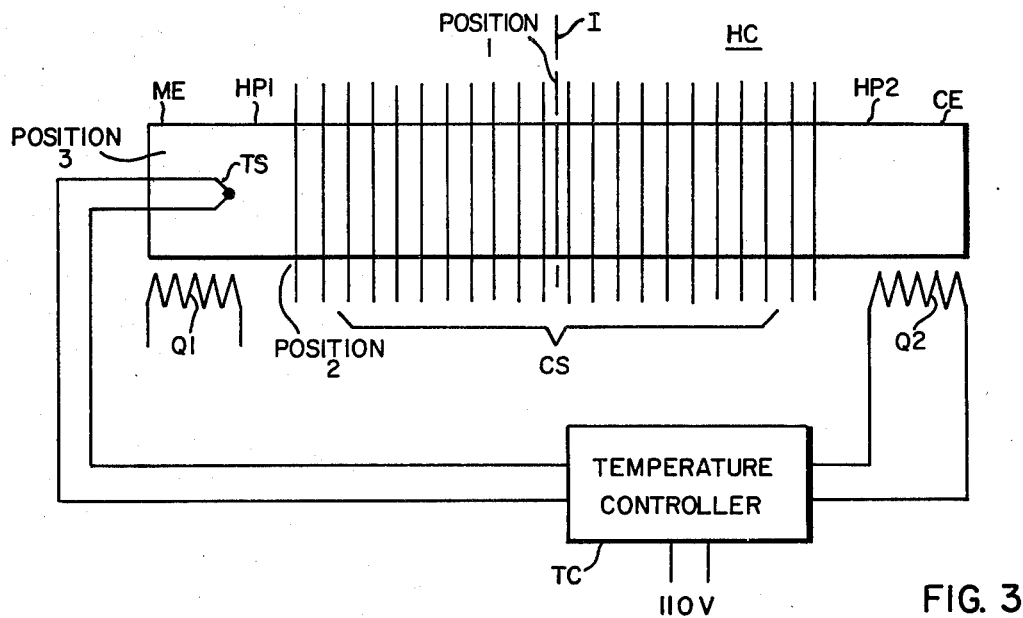
FIG. 3
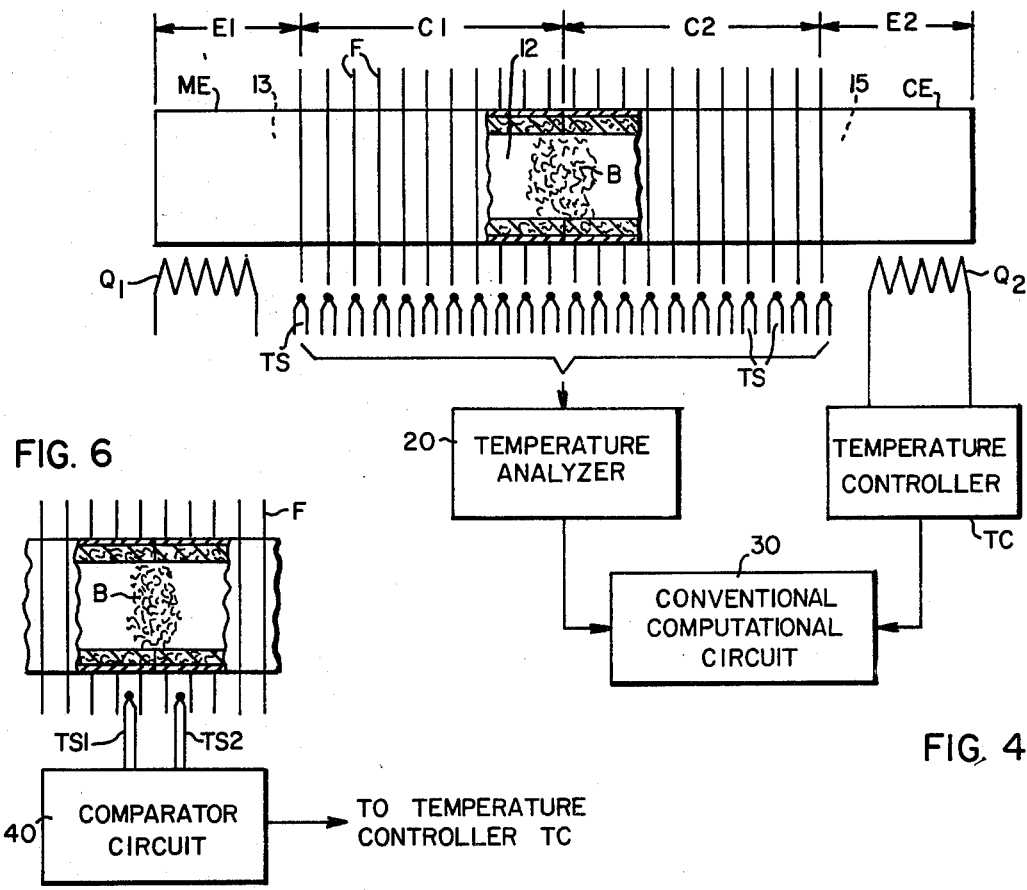
FIG. 6
FIG. 4

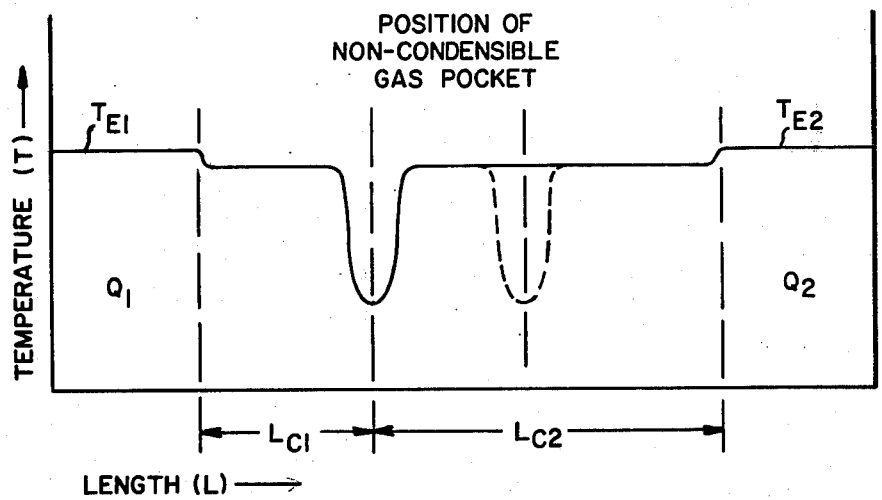
FIG. 5
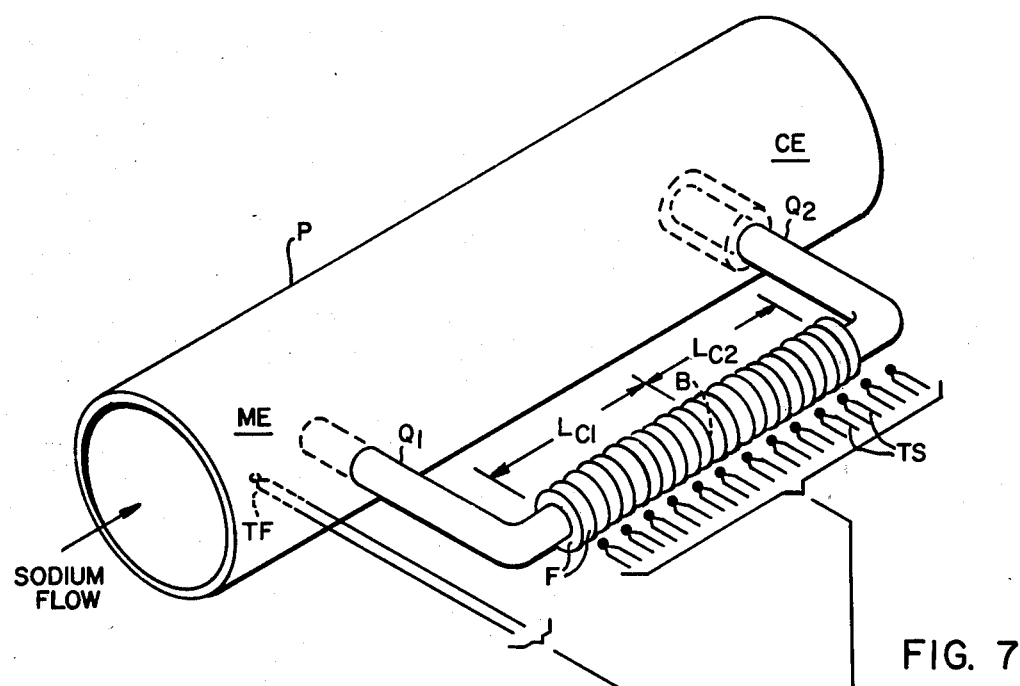
FIG. 7
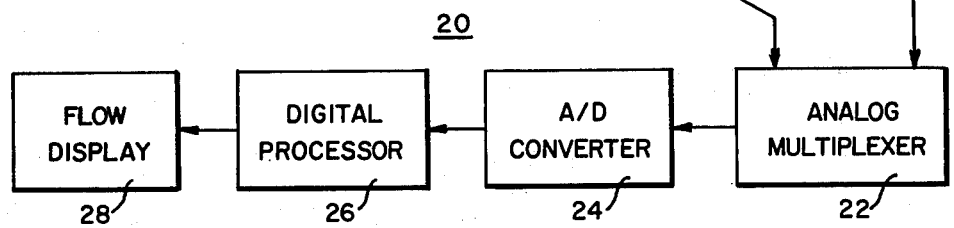

NOVEL HEAT PIPE COMBINATION

BACKGROUND OF THE INVENTION

The heat pipe is a device well-known in the art as a heat transfer mechanism suitable for removal of heat from a predetermined environment or object. Typically, a heat pipe includes a closed evacuated chamber, having inner surfaces lined with a capillary wicking structure saturated with a working fluid. Heat applied to one end or portion of the chamber, called the evaporator section, vaporizes the working fluid contained within the portion of the wick located in the evaporator section. The vaporized fluid transports its absorbed heat of vaporization to a condenser section of the heat pipe and releases it via condensation to a heat sink coupled to that condenser section of the heat pipe. The condensed fluid is drawn back to the evaporator section by the capillary action of the wick, and the vaporing heat transport cycle is repeated. The basic heat pipe concept and a unique method for heat pipe wick fabrication are described in detail in U.S. Pat. No. 3,681,843, entitled HEAT PIPE WICK FABRICATION, issued Aug. 8, 1972, assigned to the assignee of the present invention, and incorporated herein by reference.

While the conventional heat pipe described above operates isothermally at a temperature between that of the heat source and the heat sink, and variations to the basic heat pipe have been employed to establish the operation of the heat pipe at a single preselected temperature, no effective implementation of the basic heat pipe principle for controlling the heat source at various preselected temperatures, controlling the rate of heat flow from the heat source or utilizing heat pipe temperature measurements for determining heat-related parameters, such as fluid flow, have been developed.

SUMMARY OF THE INVENTION

There is described herein with reference to the accompanying drawings a novel utilization of the heat pipe principle which is based upon the combination of two conventional heat pipe structures in an end-to-end opposing relationship, with one end of the combination being exposed to and responsive to the temperature of a monitored environment or object, while the heat input to the opposite end is purposely controlled. The adjacent condenser sections of the respective heat pipes combine to form a common condenser region which is in turn coupled to an appropriate heat sink.

The temperature of the monitored end and the temperature of the controlled end of the heat pipe combination each produce a varpozation of the working fluid in the wick portion of the respective heat pipes which results in a flow of the respective vaporized fluids in opposing directions which ultimately meet to form an interaction interface within the common condenser region. The position of the interaction interface is a function of the vapor pressures in the respective heat pipes which in turn is a function of the temperatures and the respective heat source strengths at the monitored and controlled ends of the heat pipe combination.

The heat pipe combination can be employed as a heat valve or heat bridge wherein the amount of thermal coupling from the monitored end of the heat pipe combination through the common condenser region to the heat sink can be controlled or measured as a function of the heat input provided at the controlled end of the heat pipe combination.

A further modification of the heat pipe combination disclosed herein involves the processing of the heat pipe combination to develop a non-condensible gas pocket, or bubble, in the common condenser region. The gas pocket, or bubble, effectively divides the heat pipe combination into two chambers, one assoicated with the heat source of the monitored end, and the other associated with a controlled heat source coupled to the controlled end. The gas pocket moves within the common condenser region and responds to relative changes in the vapor pressure of the respective chambers produced by variation in temperature of the monitored and controlled ends of the heat pipe combination. The gas pocket moves to equalize these pressures and thus assumes a position in the common condenser region indicative of the strength of the respective heat sources associated with the monitored and controlled ends. Inasmuch as the gas pocket will appear as a temperature depression in the otherwise isothermal heat pipe combination, useful information available as a result of knowing the location of the gas pocket can be obtained by locating temperature sensors adjacent to the heat pipe combination.

The positioning of one or more thermocouples in a spaced-apart relationship along the heat pipe combination provides temperature information which can be processed and used to determine the strength of the heat source associated with the monitored end of the heat pipe combination and can be further used in a null balance mode of operation whereby the strength or temperature of the heat source associated with the monitored end can be determined as a function of the heat supplied at the controlled end.

The implementation of this heat pipe combination in connection with a controlled heating source at the controlled end extends the practical usefulness of the basic heat pipe concept from an uncontrollable passive heat removal device to a simple, general purpose device, capable of measuring the strength of an unknown heat source, controlling the temperature of an unknown heat source, controlling the heat flow to and from an unknown heat source, and developing temperature measurements suitable for calculating parameters such as fluid flow associated with the unknown heat source.

DESCRIPTION OF THE DRAWINGS

The invention becomes more readily apparent from the following exemplary description in connection with the drawings:

FIG. 3 is a schematic illustration of the heat pipe combination of FIG. 1 in a temperature control mode of operation;

FIG. 4 is a schematic illustration of the heat pipe combination of FIG. 1 in a temperature measuring mode;

FIG. 5 is a graphic illustration of the operation of the embodiment of FIG. 3;

FIG. 6 is a section illustration of an alternate embodiment of the configuration of FIG. 4; and FIG. 7 is a schematic illustration of a U-shaped embodiment of the heat pipe combination of FIG. 1.

DESCRIPTION OF THE PREFERRED EMBODIMENT

Figure 1:
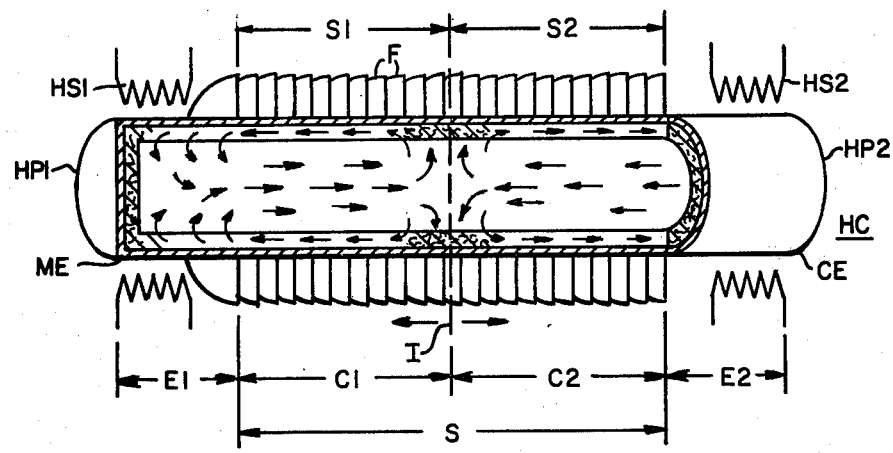
FIG. 1 is a basic sectioned schematic illustration of a novel heat pipe combination.

Referring to FIG. 1 there is a sectioned illustration of a heat pipe combination HC in accordance with the teachings of the invention wherein pipe HP1 and a pipe HP2 are combined to form the integral heat pipe combination HC having a common vapor cavity and a communicating wick structure. The construction of the respective heat pipes HP1 and HP2 are in accordance with conventional heat pipe technology wherein the portion of the heat pipe HP1 adjacent to the heat source HS1 is defined as the evaporator section E1 whereas the section of the heat pipe HP1 downstream from the evaporator section E1 and adjacent to the heat sink section S1 is defined as the condenser section C1. Similarly, the heat pipe HP2, which is connected in an end-to-end opposing relationship with the heat pipe HP1 to form the heat pipe combination HC, consists of an evaporator section E2 adjacent to heat source HS2 and a condenser section C2 corresponding to the portion of the heat pipe HP2 coupled to the heat sink section S2. Heat sink sections S1 and S2 are illustrated as consisting of radiator fins F which combine to form heat sink S of the heat pipe combination HC. Heat sink sections S1 and S2 can be radiative, convective or conductive. Heat sinks exhibit uniform heat load density relative to the condenser sections.

The heat pipes HP1 and HP2 are constructed in accordance with conventional heat pipe principles such as that disclosed in the above-referenced U.S. patent. The integral combination of the heat pipes HP1 and HP2 defines an evacuated chamber 12 whose sidewalls are lined with a capillary, or wick, 30, that is saturated with a volatile working fluid. The working fluid selected is dictated in part by the anticipated operating temperature, i.e., ammonia ($-50°$ to $+100°$ C), methanol ($0°$ to $80°$ C), water ($40°$ to $150°$ C) and sodium ($500$ to $800°$ C). The material selected for constructing the housing H is selected to be compatible with the working fluid and includes aluminum (ammonia), stainless steel (methanol and sodium) and copper (water and methanol).

The operation of the heat pipes HP1 and HP2 combines two familiar principles of physics; vapor heat transfer and capillary action. Vapor heat transfer serves to transport the heat energy from the evaporator sections E1 and E2 to the condenser sections C1 and C2 respectively which collectively form the common condenser section CS. The vapor flow from the respective heat pipes contact to form a common interaction interface I. The location of the interaction interface within the common condenser section CS is a function of the relative strengths of the heat sources HS1 and HS2. Capillary action returns the condensed working fluids of the heat pipes HP1 and HP2 back to the respective evaporator sections, as indicated by the arrows in FIG. 1, to complete the cycle.

The working fluid absorbs heat at the evaporator sections E1 and E2 and changes its liquid state to a gaseous state. The amount of heat necessary to cause this change of state is the latent heat of vaporization. As the working fluid vaporizes, the pressure in the evaporator sections E1 and E2 increases. The vapor pressure sets up a pressure differential between the evaporator sections and the condenser sections of the respective heat pipes HP1 and HP2, and this pressure differential causes the vapor, and thus the heat energy, to move from the evaporator sections to the condenser sections of the respective heat pipes. When the vapor arrives at the condenser sections C1 and C2, it is subjected to a temperature slightly lower than that of the evaporator sections due to thermal coupling to the heat sinks S1 and S2, and condensing occurs thereby releasing the thermal energy stored in the heat of vaporization at the respective condenser sections. As the vapor condenses the pressure at the condenser sections C1 and C2 decreases so that the necessary pressure differential for continued vapor heat flow is maintained.

Movement of the fluid from the condenser sections C1 and C2 back to the evaporator sections E1 and C2 respectively is accomplished by capillary action within the wick 30 which connects the condenser and evaporator sections of the respective heat pipes. The interaction interface I corresponds to the interface established by the mixing or contact of the opposed vapor flow patterns effected by the respective heat pipes HP1 and HP2. The location of the interaction interface I within the common condenser section CS of the heat pipe combination HC is a function of the heat strengths $Q_1$ and $Q_2$ associated with the heat sources HS1 and HS2 respectively.

Assuming, for the purposes of discussion, that the heat source HS1 corresponds to an electronic circuit package or a fluid flow medium which exhibits an unknown temperature condition that serves as a heat input to the evaporator section E1. In this discussion as well as subsequent discussions, this end of the heat pipe combination HC shall be identified as the monitored end ME whereas the end of the heat pipe combination coupled to the controlled heat source HS2 shall be identified as the controlled end CE. In accordance with the basic invention as disclosed in FIG. 1 and the detailed embodiments of subsequent figures, the temperature characteristics, as well as heat flow to and from an object or medium thermally coupled to the evaporator section E1 is determined as a function of the controlled temperature conditions at the evaporator section E2 and the position of the interaction interface I determined by the relative strengths of the heat sources associated with the evaporator sections E1 and E2.

Figure 2:
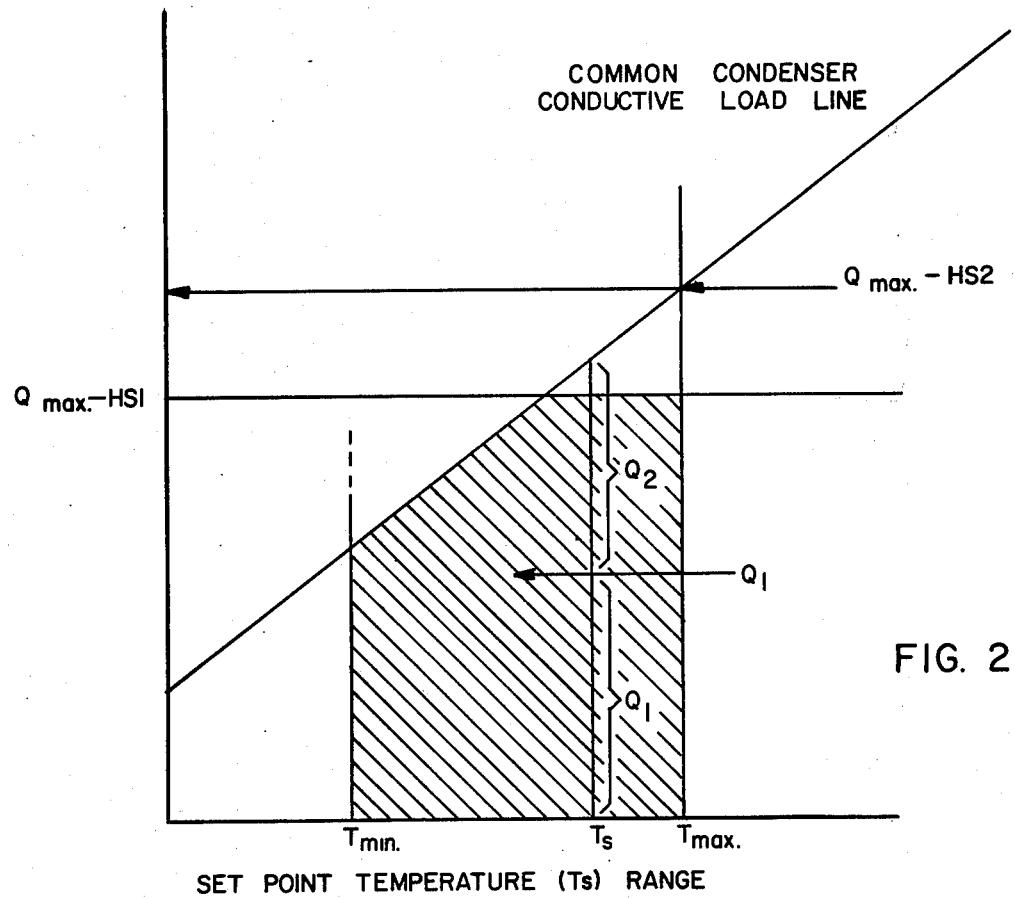
FIG. 2 is a graphic illustration of the operation of the embodiment of FIG. 1.

FIG. 2 illustrates the power-load operating window for an infinite setpoint heat pipe combination for a conductive heat load. The shaded area in FIG. 2 represents the operating range of control from temperature $T_{max}$ to $T_{min}$ for HS1 levels from 0 to $Q_{max}$. To control the heat source HS1 at temperature $T_s$, at a level $Q_1$, the heat source HS2 must contribute power $Q_2$ such that $Q_1 + Q_2$ equal the common condenser load line. Thus, at any $T_s$, the $Q_1 + Q_2$ sum is constant, and only the $Q_1$ and $Q_2$ vary to maintain $T_2$ constant. This is because both heat sources share the common condenser, which has a constant fixed load for each heat pipe temperature shown.

A simple practical embodiment of the novel heat pipe combination of FIG. 1 is schematically illustrated in FIG. 3 wherein the heat pipe combination HC is operated as a thermal controller. The position of the interaction interface I is adjusted to establish predetermined temperature conditions at the object or the medium thermally coupled to the monitored end ME of the heat pipe combination HC. The thermal condition of a monitored environment, i.e., an object or fluid medium, schematically represented as heat source HS1 produces thermal conditions $Q_1$. Temperature controller TC responds to signals from the temperature sensor TS which indicates the temperature conditions at the monitored end ME, and controls the temperature of the monitored end ME by controlling the strength of heat source HS2 associated with evaporator section E2 of the controlled end CE.

The control of the heat strength (Q) of the controlled end CE via the temperature controller TC and the heat source HS2 provides direct adjustment of the location of the interaction interface I which controls the amount of heat sink S available to dissipate the heat generated by the heat source HS1. This permits direct control of the temperature of, and heat flow to and from, the monitored environment associated with the monitored end ME of the heat pipe combination HC.

In those instances where it may be desirable to, in fact, supply heat to the monitored environment associated with the monitored end ME, the heat source strength at the controlled end CE can be elevated to a level such that the interaction interface I assumes position 2 of FIG. 3 in which no heat flow is permitted from the monitored end ME to the heat sink HS and the temperature of the monitored end ME rises due to self-heating. Heat can also be provided to the monitored environment by increasing the heat source strength $Q_2$ so as to locate the interaction interface at position 3. Practical applications of the temperature controlled embodiment of FIG. 3 include the thermal control of electronic packages, semiconductor diffusion furnaces, isotope power packages, etc.

A further modification of the basic heat pipe combination HC of FIG. 1 to effect operation in a heat strength measuring mode, includes the insertion of a non-condensible gas pocket, or bubble, B in the cavity 12 to effectively function as the interaction interface I such that the location of the gas pocket B is a function of the strengths of the heat sources associated with the opposite ends of the heat pipe combination HC. The location of the non-condensible gas pocket B within the common condenser region of the heat pipe combination HC can be identified as a temperature depression in the otherwise isothermal heat pipe combination HC.

An embodiment of the heat pipe combination HC incorporating the non-condensible gas pocket B and associated temperature sensors TS is schematically illustrated in FIG. 4. The illustration of FIG. 5 indicates the temperature depression characteristic of the non-condensible gas pocket B.

The non-condensible gas pocket B of FIG. 4, which can be satisfied through the use of any one of several suitable gases including argon, nitrogen, helium, etc., effectively partitions or divides the cavity 12 into chambers 13 and 15 with the vapor pressures in the respective chambers determined by the heat inputs $Q_1$ and $Q_2$ respectively. The location of the gas pocket B at any given time is a function of the vapor pressures in the respective chambers and is thus indicative of the temperatures of the monitored end ME and controlled end CE.

The position of the non-condensible gas pocket B is determined as a function of the signals developed by temperature sensors TS which are processed by a temperature analyzer circuit 20. An increase in the heat input at either end of the heat pipe combination HC will cause the non-condensible gas pocket B to move in a direction to increase the volume of the chamber associated with the source of greater heat input to thereby couple a larger portion of the heat sink S for removal of heat being processed by the heat pipe section subject to the higher heat input.

The non-condensible gas pocket B acts as a valve in response to the heat inputs $Q_1$ and $Q_2$ to regulate the amount of heat sink S available for thermal coupling to the condenser sections associated with the monitored end ME and the controlled end CE.

While the embodiment of FIG. 4 can operate in the temperature control mode described with respect to FIG. 2, the capability of measuring the temperature profile and accurately locating the position of the non-condensible gas pocket B via temperature sensors TS permits the operation of the heat pipe combination of FIG. 4 in a heat strength measuring mode.

In a practical embodiment, such as illustrated in FIG. 4, where it is assumed that the radiator fins F are of uniform size and uniformly positioned along the length of the common condenser region CS, and the fin area per unit axial length of the heat pipe combination HC is essentially constant, thus assuring uniform heat load, the heat input $Q_1$ of the monitored end ME can be expressed in the following equation:

$$Q_1 = Q_2(L_{C1}/L_{C2})$$

where $L_{C1}$ is the length of the condenser section between the non-condensible gas pocket B and the evaporator section E1 and $L_{C2}$ is the length of the condenser section between the non-condensible gas pocket B and the evaporator section E2.

Inasmuch as the heat input $Q_2$ is a controlled and known quantity, and the factors $L_{C1}$ and $L_{C2}$ can be determined by locating the non-condensible gas pocket B via temperature sensors TS, a conventional computational circuit 30 can solve the above equation for the unknown heat input $Q_1$. Inasmuch as the total length L of the common condenser region CS is known, temperature analyzer circuit 20 need only provide an input signal indicative either $L_{C1}$ or $L_{C2}$ since i.e., $L = L_{C1} + L_{C2}$.

There is illustrated in FIG. 6 a partial schematic illustration of a variation of the embodiment of FIG. 4 wherein but two temperature sensors, TS1 and TS2, are used to maintain the non-condensible gas pocket B at a central location, identified as position 1 in FIG. 3, within the chamber 12 to effect a null balance mode of operation of the heat pipe combination HC. The temperature sensors TS1 and TS2 are located to monitor the temperature on either side of the non-condensible gas pocket B. Temperature sensors TS1 and TS2 are electrically connected in opposing relationship such that movement of the pocket B in response to an unbalance in the heat inputs $Q_1$ and $Q_2$ will initiate adjustment in the heat input $Q_2$ in a direction to reestablish the non-condensible gas pocket B at its null or central position. In this embodiment the heat input $Q_1$ equals the heat input $Q_2$ if $L_{C1}$ equal $L_{C2}$.

The non-condensible gas pocket B can be inserted into the heat pipe combination HC via a process of titration. The precise dimensions of the relatively small non-condensible gas pocket B are not critical. It is only necessary that a sufficient amount of the non-condensible gas to be introduced to form a small pocket of finite width so as to divide the cavity 12 into the chambers 13 and 15 and provide pressure communication between the respective chambers. Slight variations in the geometry of the non-condensible gas pocket B due to pressure and temperature variations are of little consequence to the operation of the heat pipe combination HC described herein.

The heat pipe combination described above not only provides a novel technique for measuring heat flow to and from a monitored environment as well as controlling the temperature of the monitored environment, but further permits the evaluation of the thermoconductivity of materials and the heat transfer coefficients of thermal coupling systems.

While heat strength is indeed an important parameter in and of itself, it also is a significant paramter in determining factors such as fluid flow rates. It has been determined that the heat pipe combination concept, as disclosed and described above, can serve as a basis for measuring the flow rate of fluids such as sodium.

A particular geometry of the heat pipe combination suitable for use in a fluid flow system is illustrated schematically in FIG. 7. The heat pipe combination HC of FIG. 7 consists of a U-shaped configuration wherein both the monitored end ME and the controlled end CE are exposed to the fluid in a pipe or conduit P. Thus the heat inputs $Q_1$ and $Q_2$ associated with the monitored end ME and controlled end CE respectively are from the same temperature source, i.e., the fluid medium flowing in the pipe P. It has been determined experimentally, through analyses of U-shaped configurations of the type of FIG. 7 for monitoring sodium flow rates, that sodium flow rate can be determined as a function of the position of the non-condensible gas bubble B by applying the principles described above with reference to FIGS. 4 and 5. The other factors generally considered in theoretical determinations of fluid flow rate are either constants or slowly vary functions of the temperature of the fluid medium. Thus, it has been determined, that the fluid flow rates in the pipe P can be determined as a function of the temperature TF of the fluid and either of the lengths $L_{C1}$ or $L_{C2}$ which, as described above, can be used to determine the location of the non-condensible gas bubble B. In the embodiment illustrated in FIG. 7 a static environment of the fluid medium i.e., sodium, shrouds the controlled end CE of the pipe combination HC, thus rendering the heat input $Q_2$ independent of the fluid flow rate. In the embodiment of FIG. 7 both the heat inputs of $Q_1$ and $Q_2$ are derived by the same temperature source, i.e., the fluid medium in pipe P. The heat input $Q_2$ will vary as a function of the temperature of fluid medium and the thermal coupling of the condenser length $L_{C2}$. The heat input $Q_1$ will vary as a function of the flow rate of the fluid medium in the pipe P and the thermal coupling of the condenser length $L_{C1}$. The above derivation of fluid flow velocity utilizing the U-shaped pipe configuration of FIG. 7 is based on the assumption that the heat pipe is of constant diameter, constant wall thickness, and uniform heat sink area in the condenser region.

A variation to the embodiment of FIG. 7 consists of exposing both the monitored end ME and the controlled end CE to the flowing fluid medium in the pipe P but varying the area or diameter of the controlled end CE with respect to the monitored end ME. Thus the heat inputs $Q_1$ and $Q_2$ both vary with the velocity of the fluid flow in pipe P but at different rates. The non-condensible gas pocket B will adjust its position within the condenser section CS and again the determination of the location of the non-condensible gas pocket B will provide a basis for determining the flow rate of the fluid medium in pipe P as a function of heat flow.

The linear velocity of fluid in pipe P can be expressed as:

$$V = \frac{k}{\rho C_p} \left[ \frac{280 \left( \frac{L_{C1}}{L_{C2}} \frac{A_{CE}}{A_{ME}} \frac{1}{D_{CE}} - \frac{1}{D_{ME}} \right)}{\left( \frac{1}{D_{ME}^2} - \frac{L_{C1}}{L_{C2}} \frac{A_{CE}}{A_{ME}} \frac{1}{D_{ME}^2} \right)} \right]^{1.25}$$

where $K$ is the thermal conductivity of the fluid, $\rho$ is the density of the fluid, $C_p$ is the specific heat of the fluid, $A$ is the fluid exposed area of the ends CE and ME, and $D$ is the fluid exposed diameter of the ends ME and CE.

For $D_{ME} = D_{CE}$, the heat inputs are equal and the above velocity equation goes to zero.

For $D_{ME} \neq D_{CE}$, the above equation provides the linear flow velocity of the fluid in pipe P.

Commercially available circuitry including simple computer circuits can be readily employed to satisfy the above flow equation. A typical arrangement of circuitry is illustrated as the signal processing circuitry 20 of FIG. 7. The signals from temperature sensors TS and TF are supplied through an analog multiplexer circuit 22 and an analog-to-digital converter circuit 24 to provide digital inputs to the digital processer 26. The digital processor circuit 26 includes the constants of the above equation in memory and is programmed to solve the above fluid flow equation and provide an output signal indicative of fluid flow to the flow display circuit 28. The signal processing circuit 20 can be implemented through the use of the commercially available data acquisition system Micromux available from Burr-Brown.

While the noncondensible gas bubble B represents one technique for dividing the cavity 12 into the chambers 12 and 15, this partioning can also be achieved through the use of a movable element, such as a nonpervious disc, or a ping-pong ball type element, which is free to move within the cavity 12.

The substitution of this type of movable element for the gas bubble B, further permits the inclusion of a "stopper" in the form of an O-ring within the cavity 12, or projections extending into the cavity 12 which limit the movement of the movable element within the cavity 12. This could be used to establish a "diode" mode of operation of the heat pipe combination HC.

I claim:

1. Apparatus for monitoring, controlling and measuring the heat generation or dissipation rate, i.e., heat strength, of a monitored environment, comprising:
    a heat pipe combination means including a first and second pipe means each having an evaporator section and a condenser section, said first and second heat pipe means being coupled such that said condenser sections combine to form a common condenser section, the evaporator section of said first heat pipe means exposed to the monitored environment,
    heat sink means operatively coupled to said common condenser section, and
    a source of heat energy coupled to the evaporator section of said second heat pipe means for supplying a heat input to the evaporator section of said second heat pipe means to vary the amount of condenser section available to the evaporator section of said first heat pipe means.

2. Apparatus as claimed in claim 1 wherein the coupling of said first and second heat pipe means forms a common vapor cavity and a communicating wick structure.

3. Apparatus as claimed in claim 1 wherein said heat sink means exhibits uniform heat load density relative to the common condenser section.

4. Apparatus as claimed in claim 1 wherein said common condenser section exhibits uniform area per unit length relative to the heat sink means.

5. Apparatus as claimed in claim 1 wherein said heat pipe combination means responds to the respective heat strengths of the monitored environment and said source of heat energy to establish an interaction interface within said common condenser section, said interaction interface produced by opposing vapor flow patterns associated with the first and second heat pipe means.

6. Apparatus as claimed in claim 5 wherein said source of heat energy includes a controllable heating means.

7. Apparatus as claimed in claim 6 further including means for monitoring the temperature of the monitored environment and generating a signal indicative thereof, said controllable heating means responding to the signal from said means from monitoring the temperature to adjust the position of said interaction interface to control the heat flow from the monitored environment.

8. Apparatus as claimed in claim 6 further including a temperature sensing means for measuring the temperature of said monitored environment and developing a signal indicative thereof, said controllable heating means responsive to said signal from said temperature sensing means to adjust the position of said interaction interface to establish said monitored environment at a predetermined temperature.

9. Apparatus for monitoring, controlling or measuring the heat generation or dissipation rate, i.e. strength, of a monitored environment, comprising:
    a heat pipe combination means including a first and second heat pipe means, each having an evaporator section and a condenser section, said first and second heat pipe means being coupled such that said condenser sections combine to form a common condenser section, the evaporator section of said first heat pipe means being exposed to the monitored environment,
    heat sink means operatively coupled to said common condenser section,
    means for monitoring the temperature of the monitored environment and generating a signal indicative thereof; and,
    a controllable heating means operatively coupled to the evaporator section of said second heat pipe means and responsive to the signal developed by said means for monitoring the temperature to control the heating of the evaporator section of said second heat means in order to adjust the amount of condenser section available to the evaporator cection of the first heat pipe means.

10. Apparatus for monitoring, controlling and measuring the heat generation or dissipation rate, i.e., heat strength, of a monitored environment, comprising,
    a heat pipe combination means including a first and second heat pipe means each having an evaporator section and a condenser section, said first and second heat pipe means being coupled such that said condenser sections combine to form a common condenser section, the evaporator section of said first heat pipe means exposed to the monitored environment,
    heat sink means operatively coupled to said common condenser section,
    a pocket of non-condensible gas located within said common condenser section, and
    a source of heat energy coupled to the evaporator section of said second heat pipe means for supplying heat input to the evaporator section of said second heat pipe to control the location of said pocket of non-condensible gas within said common condenser section in order to control and/or measure the heat generation or dissipation rate of said monitored environment.

11. Apparatus as claimed in claim 10 wherein the coupling of said first and second heat pipe means forms a common vapor cavity and a communicating wick structure, said pocket of non-condensible gas dividing said cavity into a first and second chamber, the vapor pressure in said first chamber being a function of the heat strength of the monitored environment, the vapor pressure in said second chamber being a function of the heat strength of said source of known heat energy.

12. Apparatus as claimed in claim 10 wherein said heat sink means can be either a radiative, convective or conductive heat sink means.

13. Apparatus as claimed in claim 10 wherein said heat sink means exhibits uniform heat load density relative to the common condenser section.

14. Apparatus as claimed in claim 10 wherein said common condenser section exhibits uniform area per unit length relative to the heat sink means.

15. Apparatus as claimed in claim 10 further including means for determining the location of said pocket of non-condensible gas, said location being a function of the heat strengths of said monitored environment and said source of known heat energy.

16. Apparatus as claimed in claim 15 wherein said means for determining the location of said pocket of non-condensible gas includes temperature sensing means operatively coupled to said common condenser section.

17. Apparatus as claimed in claim 10 wherein said source of known heat energy includes a controllable heating means.

18. Apparatus as claimed in claim 17 including means for controlling the heat strength of said controllable heating means to adjust the location of said pocket of non-condensible gas to maintain the heat strength of said monitored environment at a predetermined level.

19. Apparatus for measuring the velocity of fluid flow as a function of the heat strength of the fluid flow, comprising,
    heat pipe combination means including a first and second heat pipe means each having an evaporator section and a condenser section, said first and second heat pipe means being coupled such that said condenser sections combine to form a common condenser section, the evaporator section of said first heat pipe means being exposed to a flowing fluid,
    the evaporator sections of said first and second heat pipe means being exposed to the temperature of the flowing fluid,
    heat sink means operatively coupled to said common condenser section, a pocket of non-condensible gas inserted within said common condenser section and being positioned within said common condenser section as a function of the heat strength of said flowing fluid contacting the evaporator section of said first heat pipe means, means for determining the location of said pocket of non-condensible gas within said common condenser section representing the heat strength of said flowing fluid and developing a signal indicative thereof, and circuit means responsive to said signal for producing an output signal indicative of the velocity of said fluid flow.

* * * * *